Jan. 3, 1950  R. W. POINTER  2,493,023
RESILIENT OSCILLATING AXLE SUSPENSION
Filed Nov. 28, 1945  3 Sheets-Sheet 1
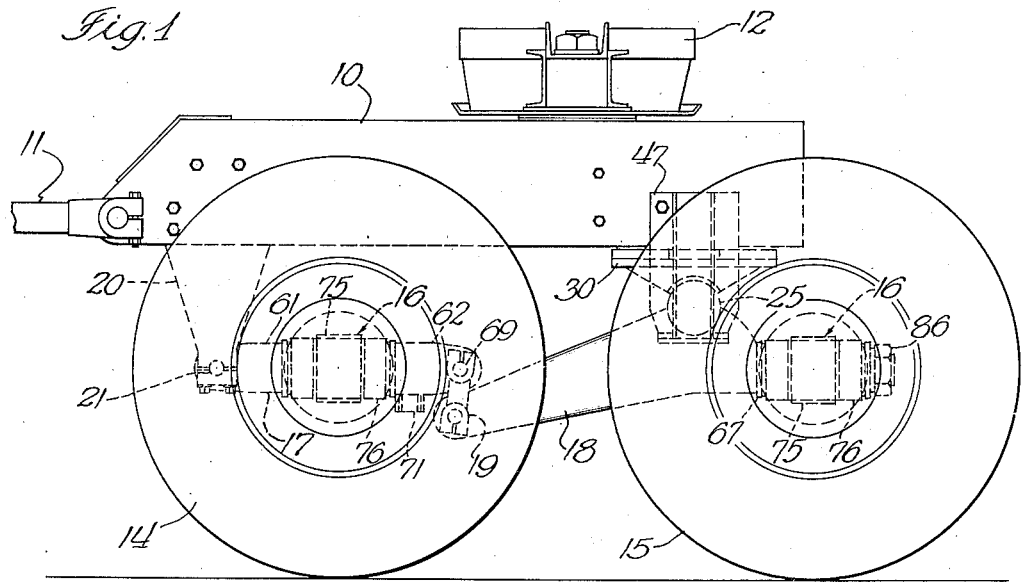
Fig. 1
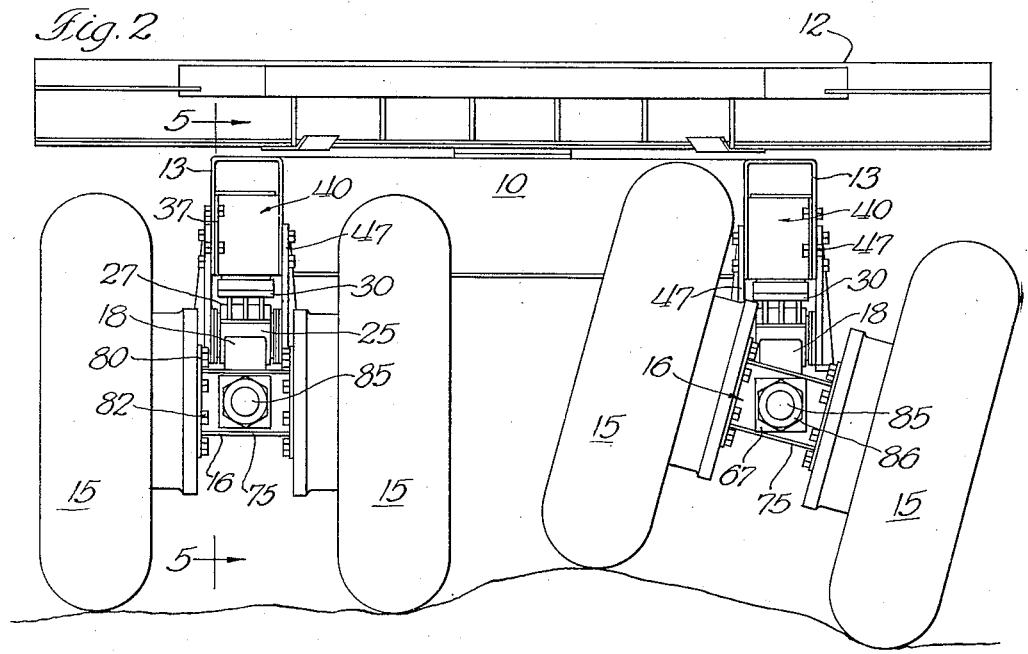
Fig. 2
Robert W. Pointer
INVENTOR
BY
ATTORNEY Jan. 3, 1950   R. W. POINTER   2,493,023
RESILIENT OSCILLATING AXLE SUSPENSION
Filed Nov. 28, 1945   3 Sheets-Sheet 2
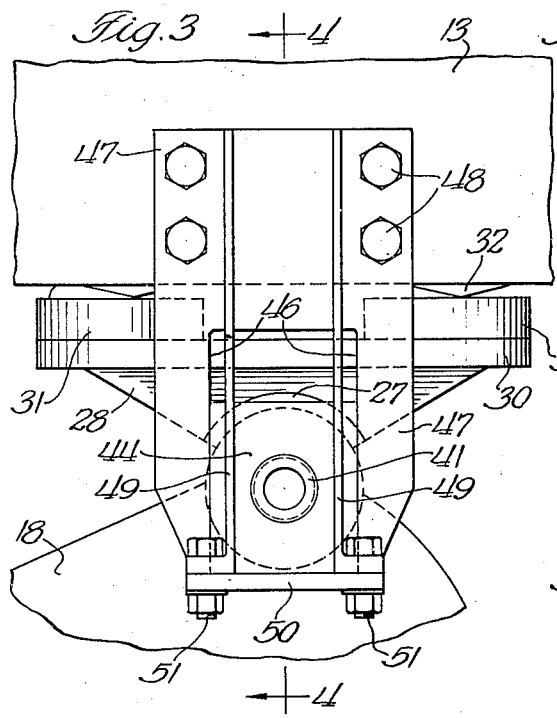
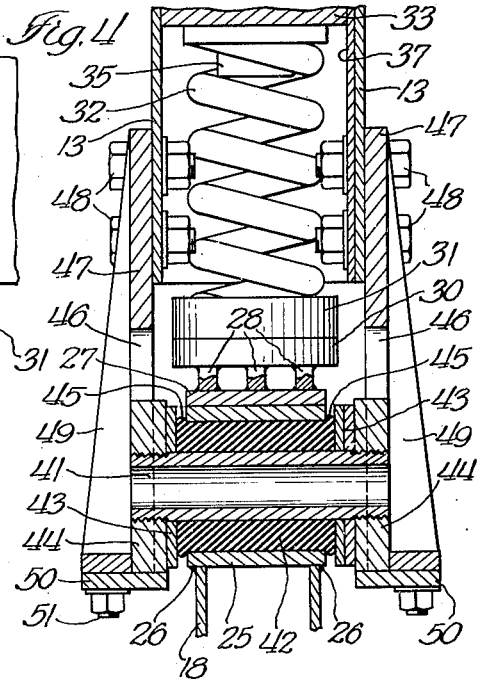
Robert W. Pointer
INVENTOR
BY
ATTORNEY Jan. 3, 1950   R. W. POINTER   2,493,023
RESILIENT OSCILLATING AXLE SUSPENSION
Filed Nov. 28, 1945   3 Sheets-Sheet 3
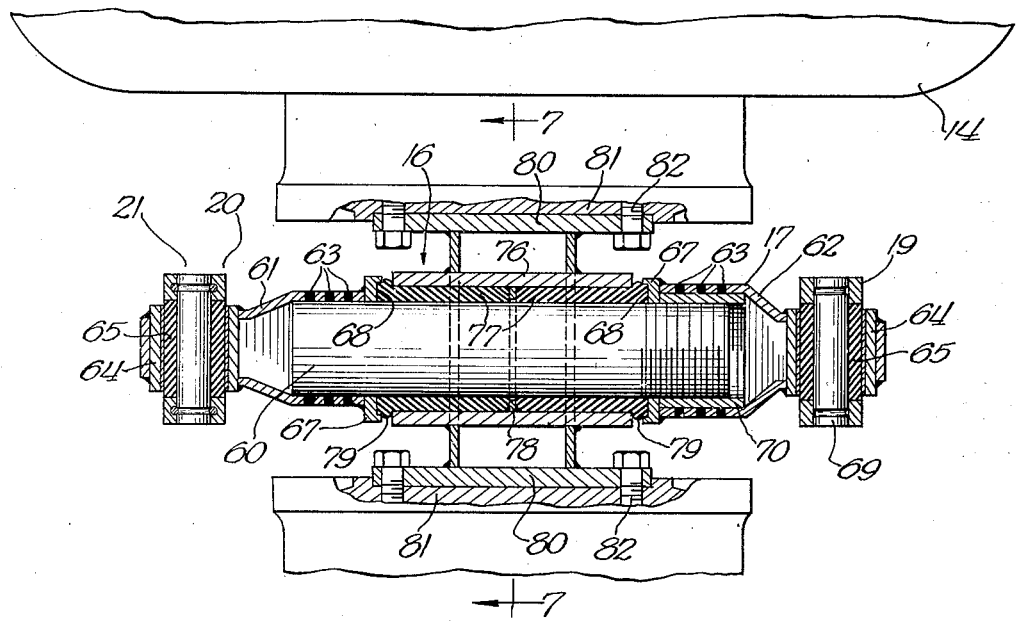
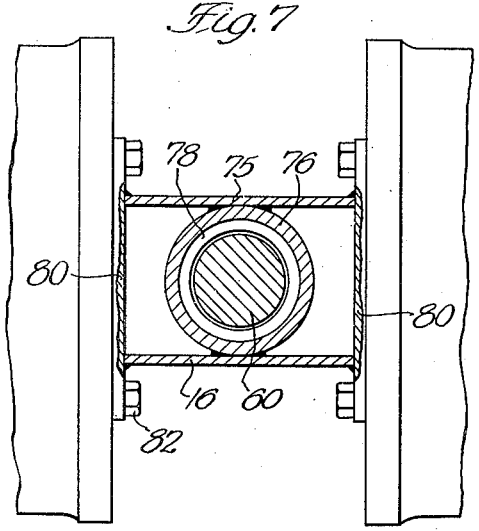
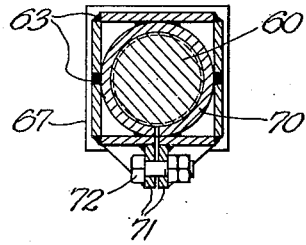
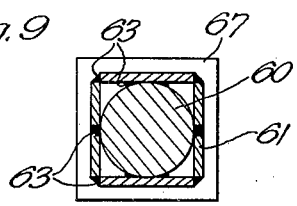
Robert W. Pointer
INVENTOR
BY
ATTORNEY Patented Jan. 3, 1950

2,493,023

UNITED STATES PATENT OFFICE 2,493,023

RESILIENT OSCILLATING AXLE SUSPENSION

Robert W. Pointer, Portland, Oreg.

Application November 28, 1945, Serial No. 631,289

14 Claims. (Cl. 280—104.5)

1

This invention relates to a vehicle spring suspension having oscillating axles mounted on dual walking beams.

The primary object of the invention is to provide an improved construction which combines novel variations of basic features and advantages disclosed and claimed in certain other of my copending applications for Letters Patent. Serial No. 632,549, entitled Beam suspension for vehicles, filed December 3, 1945, discloses a dual beam, dual axle system wherein the wheel torque reactions are neutralized through the interconnection between the two walking beams, and wherein the resilience of the system allows a certain amount of shifting of the axles to facilitate self steering on curves. Serial No. 632,550, entitled Resilient suspension for vehicles, filed December 3, 1945, relates to a spring and trunnion guide assembly constituting a resilient mounting for the walking beams in a dual beam, dual axle system. Serial No. 631,288, entitled Oscillating axle suspension, filed November 28, 1945, relates to a novel oscillating axle arrangement applied to a dual beam system having no spring mounting on the vehicle frame.

The present invention combines modifications of these various features to provide an improved suspension for heavy vehicles which will be economical to build and maintain and which, at the same time, will be sufficiently rugged for hauling heavy loads over rough, unimproved roads. Other general objects accomplished by the present construction are the reduction of drawbar pull and the substantial elimination of dragging and scuffing of the tires ordinarily encountered in multi-wheeled vehicles.

A particular object of the invention is to provide a dual walking beam suspension which will neutralize the torque reactions of the wheels to maintain equal traction and loading on all the wheels at all times.

A further object is to provide a novel dual beam suspension for mounting oscillating axles.

A further object is to provide a novel construction and arrangement for mounting dual wheel oscillating axles on rubber bushings on walking beam journals or the like.

A further object is to provide a novel resilient assembly and trunnion guide for walking beams carrying independent dual wheels on oscillating axles.

A further object is to provide a novel dual walking beam suspension carrying dual wheels on oscillating axles to distribute the weight of the vehicle both longitudinally and laterally of the road surface.

Additional objects and advantages inherent in certain features of the construction are recited in the applications above referred to, and still further objects and advantages will become apparent to those skilled in the art as the specification proceeds in connection with the accompanying drawings illustrating a preferred embodiment of the invention.

The construction embodying the principles of the invention in which the foregoing objects are accomplished comprises a resiliently mounted dual beam vehicle suspension having pairs of independent wheels mounted on oscillating axles on longitudinal journals in the walking beams. On each side of the vehicle there is a front walking beam having its front end pivotally connected with the vehicle and its rear end connected through a tension shackle to the front end of a rear walking beam. The rear walking beam supports the vehicle on a resilient assembly bearing upon a trunnion on an intermediate portion of the beam. The front walking beam has a longitudinal journal intermediate its ends and directly under a longitudinal member of the vehicle frame for mounting an oscillating axle unit on rubber bushings. Individual wheels mounted on the ends of the oscillating axle are thereby disposed upon opposite sides of the walking beam and longitudinal frame member, sufficient clearance being provided under the vehicle to allow considerable pivotal action of the oscillating axle unit about the journal in a transverse plane. The rear walking beam carries a longitudinal journal on its rear end behind the trunnion support and directly beneath the frame member for mounting an oscillating axle unit in a similar manner. The movements of the oscillating axles and the play of the interconnected walking beams is such as to permit the various wheels to adjust themselves to the ground contour as the vehicle travels thereover with a minimum of raising and lowering of the points of support on the vehicle frame.

A spring and shock absorber assembly supports the weight of the vehicle on a spring rider and trunnion saddle bearing upon the rear walking beam trunnion so that this beam is free to oscillate in the saddle. Inasmuch as this trunnion lies between the wheels of the rear oscillating axle unit, a novel guide box is provided on the spring and shock absorber assembly for maintaining the rear walking beam in its proper position and alignment, while at the same time permitting oscillating of the beam in the trunnion saddle and vertical movements of the beam under the spring action. In a preferred construction the vehicle frame comprises longitudinal members of inverted U-shape capable of housing the spring and shock absorber assemblies. The guide boxes associated therewith comprise downwardly extending vertical guide members rigidly secured to the frame on opposite sides of the spring and shock absorber assembly. A short trunnion guide shaft secured in a resilient bushing in the rear walking beam trunnion has a guide block secured at each end for vertical travel in the guide members. The trunnion saddles, trunnions and walking beams are thereby maintained in alignment, one above the other, in the vertical plane of the longitudinal frame member of the vehicle. The construction and arrangement of the various parts will be described in detail with reference to the accompanying drawings.

In the drawings:

Figure 1 is a view in side elevation of a logging trailer embodying the principles of the invention;

Figure 2 is a rear elevation view of the trailer shown in Figure 1, illustrating the operation of one of the oscillating axle units on uneven ground;

Figure 3 is an enlarged view in side elevation of the guide box and trunnion for a rear walking beam;

Figure 4 is a transverse sectional view taken on the line 4—4 of Figure 3;

Figure 5 is a view taken on the line 5—5 of Figure 2;

Figure 6 is a view through the front walking beam and oscillating axle unit taken on the line 6—6 of Figure 5;

Figure 7 is a sectional view taken on the line 7—7 of Figure 6;

Figure 8 is a cross sectional view through the rear end of the front walking beam, taken on the line 8—8 of Figure 5; and Figure 9 is a cross section of the front end of the front walking beam taken on the line 9—9 of Figure 5.

The invention is embodied in the suspension and running gear of the logging trailer shown in Figures 1 and 2. The trailer has a frame 10 which may be pulled by an automotive tractor unit by means of a drawbar 11, the usual bunk or other load supporting member 12 being carried by the frame 10 on a conventional fifth wheel connection. The frame comprises a pair of longitudinal members 13 of inverted U-shape in cross section which are utilized to house resilient assemblies for supporting the vehicle upon the dual walking beams. The numerals 14 and 15 designate pairs of independent wheels mounted on oscillating axle units 16 on the two walking beams. The walking beams may be identified as a front walking beam 17 and a rear walking beam 18 connected therewith by a tension shackle 19, the front walking beam 17 being directly connected with the vehicle frame through a bracket or hanger 20 having a pin connection 21.

The supporting and guiding structure associated with the rear walking beam and its trunnion is shown in Figures 3 to 5. The trunnion itself comprises a short steel tube 25 welded into the upper edge of the beam 18, the tube having a length only slightly greater than the width of the beam to facilitate making the welds 26. This tube is set in the beam so as to leave nearly 180 degrees of its upper exterior surface exposed and available to provide seating for an arcuate saddle bearing 27 which supports the vehicle frame upon the trunnion. A plurality of webs 28 integrally unite the saddle 27 with a spring rider plate 30 having a pair of spring cups 31 seating coil springs 32. The upper ends of the springs 32 carry the weight of the vehicle upon a spring base plate 33 rigidly secured in the frame member 13 and backed up by suitable webs or gussets 34, the upper ends of the springs being seated around spring centers 35.

To control the spring action a shock absorber 36 is disposed between the springs so as to bear upon the spring rider and base plates 30 and 33. This shock absorber is preferably of the type disclosed and claimed in the patent to Dath 2,373,813, dated April 17, 1945. The spring and shock absorber assembly may be enclosed within a housing 37 rigidly connected with the spring base plate 33 and secured within the vehicle frame by means of bolts 38, or the like, the assembly as a whole being designated generally by the numeral 40.

By virtue of the flexible connection between the walking beams, the spring assembly 40 is effective to cushion road shocks on both pairs of wheels 14 and 15, producing a vertical play of the spring rider 30 against the springs 32. The arcuate extent of the trunnion saddle 27 is approximately 90 degrees to allow for rocking of the trunnion in the saddle. By housing the spring assembly 40 within the frame member 13 a low suspension is provided and the application of the weight is kept vertically above the trunnion and walking beams.

The guide box construction shown in Figures 3 and 4 maintains the trunnion and walking beam in position and alignment beneath the vehicle frame, while, at the same time, allowing the walking beam freedom for rocking and vertical movements with the play of the spring suspension. The guiding function is accomplished by a short trunnion shaft 41 mounted in a resilient rubber bushing 42 within the trunnion tube 25. The ends of the trunnion shaft carry washers 43 and rectangular guide blocks 44, the latter being tightened on the shaft to longitudinally compress the bushing 42 to cause it to bulge out at the ends as shown at 45. When the proper compression of the bushing is obtained by the guide blocks 44, the bulges 45 are effective to maintain the trunnion tube 25 permanently spaced equidistantly between the washers 43. A pair of flanged bushings may be used if desired in place of the single bushing 42, each flange supplying in effect a preformed bulge at 45.

The rectangular guide blocks 44 move in vertical slides 46 in plates 47 secured on opposite sides of the frame member 13 by bolts 48, certain of these bolts securing both the plates 47 and the housing member 37 to the frame member. Triangular webs or braces 49 are provided to stiffen the plates 47 and to bear against the outer faces of the sliding guide blocks 44 and bottom plates 50 are secured thereto to limit the spring travel and maintain the parts in assembled relation. Convenient fastening means such as bolts 51 facilitate disassembly to replace wearing parts.

The construction of the front walking beam and its associated oscillating axle unit will now be described with particular reference to Figures 6 to 9. The front walking beam 17 comprises a central journal 60, a forward hanger end 61 of box construction for connection with the pivot pin 21, and a rear hanger end 62 of box construction for connection with the shackle 19. The end 61 may be integrally united with the journal 60 by means of a plurality of welds 63 and within the extremity of this end is an integral bearing tube 64 containing a rubber bushing 65 around the pin 21. On the inner end of the box section 61 there is a square washer 67 having a circular bushing recess 68.

The other end of the walking beam 17 is also of hollow box construction but is made removable for access to the journal 60. Instead of being welded to the journal, the box end 62 is split and welded to an internally threaded split tube 70 so that the end of the beam can be unscrewed from the journal. As shown in Figure 8, the box comprising the end 62 is split longitudinally and equipped with reinforced ears 71 which may be clamped together by a bolt 72 to hold the end securely on the threaded journal. At the inner end of the box section 62 there is another washer 67 having an annular bushing recess 68. The extremity of the box end 62 carries a tube 64 having a bushing 65 surrounding a pin 69 in the shackle 19.

Each oscillating axle unit 16 comprising a short rectangular axle beam 75 of hollow box construction integral with a steel bearing tube 76 which is mounted upon a pair of rubber bushings 77 on the journal 60, axial shifting of the bearing tube 76 on the journal being prevented by an integral spacing ring 78 between the bushings, the outer ends of the latter being confined between the washers 67. As an additional safeguard against shifting of the oscillating axle unit along the journal, the bushings may be flanged on their outer ends, or they may be compressed axially by the washers 67 to produce a bulge at 79 between the ends of the tube 76 and the washers.

The axle beam 75 carries an integral flange plate 80 at each end thereof for mounting removable axle spindles 81 by means of a plurality of bolts or cap screws 82, the axle beam being only long enough to provide the necessary clearance for the tires and brake mechanisms so that the beam may oscillate approximately twenty degrees in each direction from the horizontal. The provision of rubber bushings 65 and 77 obviates the necessity for lubrication or other periodic service, so that as far as the beam suspension is concerned the vehicle may run indefinitely without servicing.

The major part of the rear walking beam 18 is also of hollow box construction, but this beam carries a journal 85 at its rear extremity for mounting an oscillating axle unit to the rear of the trunnion 25. The journal 85 is supported as a cantilever in the beam 18 and carries rubber bushings 77 and clamping washers 67 for mounting an oscillating axle unit 16 identical with the unit 16 on the front walking beam. The oscillating unit is secured in place and the rubber bushings compressed by means of a nut 86 and a collar 87 on the extremity of the journal, as shown in Figure 5.

The present suspension system is inherently stable and self-aligning. Although the various rubber bushings in the pivotal connections between different members allow a slight displacement of the members to absorb road shocks and to permit a slight shifting of the alignment of the axles on curves, the tension shackle 19 constitutes an ever present restoring force tending to return the beams to their proper positions. This shackle connection also balances and neutralizes the torque reactions on the wheels when the brakes are suddenly applied to prevent the rear wheels from tending to lift up off the road.

Various changes may be made in the construction and arrangement of parts, and all such modifications which fall within the scope of the appended claims are included in the invention. Although the invention is disclosed in connection with a log trailer having a load supporting bunk, it is equally applicable to full and semi trailer units of different types, the present embodiment being shown and described for purposes of illustration and not for the purpose of limiting the invention.

Having now described my invention and in what manner the same may be used, what I claim as new and desire to protect by Letters Patent is:

1. In a vehicle suspension, a pair of interconnected walking beams, oscillating axles pivotally mounted on said walking beams, a trunnion on one of said beams, and a spring assembly supporting said vehicle upon said trunnion.

2. A vehicle suspension comprising a first walking beam pivotally mounted at one end on the frame of the vehicle, an oscillating axle pivotally mounted on a mid portion of said walking beam, a second walking beam having a shackle connection at one end with the other end of the first walking beam, an oscillating axle pivotally mounted on the other end of said second walking beam, a trunnion on said second walking beam, and a spring assembly supporting said frame upon said trunnion.

3. A vehicle suspension comprising a first walking beam pivoted at one end to the frame of said vehicle, an oscillating axle pivotally mounted on a mid portion of said beam, a second walking beam having a trunnion intermediate its ends, a trunnion saddle riding on said trunnion, a spring assembly supporting the vehicle upon said trunnion saddle, an oscillating axle pivotally mounted on one end of said second walking beam, and a tension shackle interconnecting the remaining ends of said two walking beams to balance the brake torques on said axles when the brakes are applied.

4. In a vehicle suspension, a walking beam, a trunnion on said walking beam, a saddle on said trunnion, a spring assembly supporting the frame of said vehicle on said saddle, a resilient bushing in said trunnion, a trunnion shaft in said bushing, a pair of vertical guide boxes secured to said vehicle frame adjacent said trunnion, and guide means on the ends of said trunnion shaft for guiding said shaft for vertical movement in said guide boxes.

5. In a vehicle suspension, an axle carrying member, a hollow tubular trunnion on said member, a resilient bushing in said trunnion, a trunnion shaft in said bushing having its ends extending outside of said trunnion, guide blocks mounted on said shaft ends, a saddle on said trunnion, a spring assembly housed within the vehicle frame and supporting said frame upon said saddle, and a pair of vertical guide boxes rigidly mounted on said frame for guiding said guide blocks in vertical movement.

6. A vehicle suspension comprising a walking beam, an oscillating axle pivotally mounted on said beam and carrying wheels on opposite sides of said beam, a trunnion on said beam between said wheels, a saddle on said trunnion, a resilient assembly on said saddle supporting a frame member of said vehicle between said wheels, a resilient bushing in said trunnion, guide means in said bushing, and guide means for cooperation with said trunnion guide means rigidly secured to said frame member between said wheels.

7. In a vehicle suspension, a frame member of inverted U section, a spring assembly housed within said frame member, a walking beam vertically beneath said frame member, a trunnion on said walking beam, a saddle on said trunnion supporting said frame member through said spring assembly, a resilient bushing in said trunnion, a trunnion shaft in said bushing, guide means on the ends of said trunnion shaft, a pair of vertical guide boxes extending downwardly from said frame and engaging said guide means, and an oscillating axle pivotally mounted on said walking beam and carrying wheels on opposite sides of said beam and said frame member.

8. In a vehicle suspension, an oscillating axle unit comprising an axle beam of hollow box construction, flanges on the ends of said beam for mounting removable wheel spindles, a transverse bearing tube in said axle beam, a resilient bushing in said bearing tube, a walking beam having a longitudinal journal within said bushing, and means to secure said bushing in a fixed position on said journal and to secure said bearing tube in a fixed position on said bushing.

9. In a vehicle suspension, an oscillating axle, a transverse bearing tube in said axle, an integral spacing ring within said tube, and a pair of resilient bushings within said tube and abutting said spacing ring on opposite sides.

10. In a vehicle suspension, a walking beam having a journal extending from one end thereof, a pair of resilient bushings on said journal, an oscillating axle beam having a bearing tube mounted on said bushings, an integral separator ring in said bearing tube between the ends of said bushings, and means on the end of said journal for longitudinally clamping said bushings together against said separator ring to secure said oscillating axle beam on said journal.

11. In a vehicle suspension, a walking beam comprising a cylindrical journal adapted for mounting an oscillating axle unit, beam hanger ends of hollow box construction fixedly mounted on the opposite ends of said journal, and pin connector means in said beam ends for connecting said beam in said suspension.

12. In a vehicle suspension, a walking beam comprising a cylindrical journal, an integral beam end on said journal of hollow box construction having a bearing tube for the suspension of said beam, and a second beam end of hollow box construction having a bearing tube for the suspension of the beam, said second beam end having screw threaded connection with one end of said journal for removal therefrom for mounting an oscillating axle unit thereon.

13. In a vehicle suspension, a walking beam assembly comprising a journal, a walking beam hanger end integrally united with one end of said journal, a resilient bushing on said journal, an oscillating axle mounted on said bushing, a second walking beam hanger end removable from said journal for mounting said oscillating axle thereon, and means for securing said seconds hanger end on said journal to compress said bushing and longitudinally position said oscillating axle on said journal.

14. A vehicle suspension comprising a pair of pivotally interconnected walking beams, an oscillating axle pivotally mounted on each beam, a trunnion on one of said beams, and a resilient assembly supporting said vehicle upon said trunnion.

ROBERT W. POINTER.

REFERENCES CITED

The following references are of record in the file of this patent:

UNITED STATES PATENTS

| Number | Name | Date |
| --- | --- | --- |
| 2,110,214 | Flowers | Mar. 8, 1938 |
| 2,121,862 | Dodge | June 28, 1938 |
| 2,193,567 | Pointer | Mar. 12, 1940 |
| 2,398,248 | Reid | Apr. 9, 1946 |